US009323971B2

(12) United States Patent
Iwata et al.

(10) Patent No.: US 9,323,971 B2
(45) Date of Patent: Apr. 26, 2016

(54) BIOMETRIC AUTHENTICATION APPARATUS AND BIOMETRIC AUTHENTICATION METHOD

(75) Inventors: Tomoomi Iwata, Tokyo (JP); Teruyuki Higuchi, Tokyo (JP); Takeo Tamura, Tokyo (JP); Toshio Kamei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/824,120

(22) PCT Filed: Nov. 7, 2011

(86) PCT No.: PCT/JP2011/075551
§ 371 (c)(1),
(2), (4) Date: Mar. 15, 2013

(87) PCT Pub. No.: WO2012/063761
PCT Pub. Date: May 18, 2012

(65) Prior Publication Data
US 2013/0182921 A1    Jul. 18, 2013

(30) Foreign Application Priority Data

Nov. 8, 2010  (JP) ................................ 2010-249629

(51) Int. Cl.
*G06K 9/00* (2006.01)
(52) U.S. Cl.
CPC ........ *G06K 9/00013* (2013.01); *G06K 9/00912* (2013.01)
(58) Field of Classification Search
None
See application file for complete search history.

(56) References Cited

U.S. PATENT DOCUMENTS

| | | | |
|---|---|---|---|
| 6,937,748 B1* | 8/2005 | Schneider et al. | 382/126 |
| 2005/0180619 A1* | 8/2005 | McClurg et al. | 382/124 |
| 2006/0078176 A1* | 4/2006 | Abiko et al. | 382/124 |
| 2009/0157537 A1* | 6/2009 | Miller | G06Q 10/109 705/32 |
| 2010/0208953 A1* | 8/2010 | Gardner et al. | 382/124 |
| 2011/0085708 A1* | 4/2011 | Martin et al. | 382/115 |
| 2011/0129128 A1* | 6/2011 | Makimoto et al. | 382/124 |

FOREIGN PATENT DOCUMENTS

| | | |
|---|---|---|
| CN | 101615249 A | 12/2009 |
| EP | 2138954 A2 | 12/2009 |
| JP | 2005323892 A | 11/2005 |
| JP | 2007257307 A | 10/2007 |
| JP | 2007272527 A | 10/2007 |
| JP | 2008015939 A | 1/2008 |
| JP | 2008129995 A | 6/2008 |
| JP | 2009110132 A | 5/2009 |
| JP | 2010-211579 A | 9/2010 |

OTHER PUBLICATIONS

The international search report for PCT/JP2011/075551 mailed on Nov. 29, 2011.
Japanese Office Action for JP Application No. 2012-542906 mailed on Aug. 26, 2015 with English Translation.
Chinese Office Action for CN Application No. 201180052024.6 Issued on Dec. 25, 2015.

* cited by examiner

*Primary Examiner* — David F Dunphy (57) ABSTRACT

A biometric authentication apparatus of the present invention comprises: a finger-tip placing detecting means for detecting placing of a finger-tip onto a finger-tip placing section; a finger-base-part placing detecting means for detecting placing of a finger-base part onto a finger-base-part placing section; and a guidance means for conducting guidance of whether or not the finger-tip or the finger-base part has been placed, on the basis of the results of the detections conducted by the finger-tip placing detecting means and the finger-base-part placing detecting means.

11 Claims, 12 Drawing Sheets

TIP OF FINGER HAS NOT BEEN PLACED

FLASHED          FLASHED

BASE OF FINGER HAS BEEN PLACED

LIGHTED          LIGHTED

FIG. 6

TIP OF FINGER HAS
BEEN PLACED

30A

30B

LIGHTED  LIGHTED

BASE OF FINGER HAS
BEEN PLACED

31A

31B

LIGHTED  LIGHTED

FIG. 13

BIOMETRIC AUTHENTICATION APPARATUS AND BIOMETRIC AUTHENTICATION METHOD

This application is a National Stage Entry of PCT/JP2011/075551 filed Nov. 7, 2011, which claims priority from Japanese Patent Application 2010-249629 filed Nov. 8, 2010, the contents of all of which are incorporated herein by reference, in their entirety.

TECHNICAL FIELD

The present invention relates to a biometric authentication apparatus and a biometric authentication method.

BACKGROUND ART

The biometric authentication technology of authenticating a person using an image of a finger is known as a technique of collating a pattern of an epidermis such as a fingerprint of a finger, and a pattern of a blood vessel with previously registered information.

In the biometric authentication apparatus employing this technology, correct authentication cannot be obtained, the personal authentication is rejected as NG (No Good), and much time for the authentication is required unless the fingerprint etc., being a target of authentication, is imaged in a situation in which the fingerprint etc. is arranged at a correct position in the biometric authentication apparatus.

Thereupon, the individual authentication apparatus by a finger vein that aims for enabling a user to easily recognize a position for placing the finger is described in Patent literature 1.

The individual authentication apparatus described in the Patent literature 1 notifies a user of the position for placing the finger by lighting the position, and reduces displacement of the finger by making the user press a data loading switch while adjusting the finger to a light emission unit.

CITATION LIST

Patent Literature

PTL 1: JP-P2005-323892A

SUMMARY OF INVENTION

Technical Problem

However, the invention disclosed in the above-described Patent literature 1 has the following problems.

The invention of the Patent literature 1 is an invention that notifies the user of the position for placing the finger by lighting the position, and the finger is not always placed correctly at the above position, hence when the authentication is started in a situation in which the finger has not been correctly placed, the correct authentication cannot be obtained, the personal authentication is rejected as NG, and much time for the authentication is required.

Further, when the user who performs the authentication remains unknown about why the authentication is rejected as NG, he/her cannot grasp how to place the finger and becomes perplexed in many cases.

Thereupon, the present invention has been accomplished in consideration of the above-mentioned problems, and an object of the present invention is to provide a biometric authentication apparatus and a biometric authentication method that enable the user to know nonconformity of placement of the finger, being a target of the authentication.

Means for Solving Problem

The present invention for solving the above-mentioned problems is a biometric authentication apparatus, comprising: a fingertip placement detection means that detects placement of a tip of a finger on a fingertip placement section; a finger base placement detection means that detects placement of a base of a finger on a finger base placement section; and a guidance means that performs guidance of existence of the placement of said tip of the finger or said base of the finger based on a detection result by said fingertip placement detection means and a detection result by said finger base placement detection means.

The present invention for solving the above-mentioned problems is a biometric authentication method, comprising: detecting placement of a tip of a finger on a fingertip placement section; detecting placement of a base of a finger on a finger base placement section; and performing guidance of existence of the placement of said tip of the finger or said base of the finger based on a detection result of the placement of said tip of the finger and a detection result of the placement of said base of the finger.

Advantageous Effect of Invention

The present invention enables the user to know malfunction of the placement of the finger, being a target of the authentication.

DESCRIPTION OF EMBODIMENTS

First Exemplary Embodiment

The biometric authentication apparatus relating to the first exemplary embodiment, which is an apparatus that simultaneously images the fingerprint of the finger of the user and the vein existing inside it, can be utilized, for example, as the individual authentication apparatus (biometric authentication apparatus) that authenticates the person by utilizing the imaged fingerprint and vein of the finger. The finger to be imaged could be any finger (a thumb, an index finger, a middle finger, a ring finger, and a little finger); however, herein, the case of imaging the fingerprint and the vein of the index finger (hereinafter, simply, referred to as a "finger") is exemplified for explanation. Additionally, the target of the authentication and the portion to be imaged are not limited to the above-mentioned fingerprint and vein of the finger, and for example, a pattern of an epidermis such as a palm, and a blood vessel pattern inside skin, and the like may be used so long as they are portions that can be subjected to the imaging and the authentication.

Figure 1:
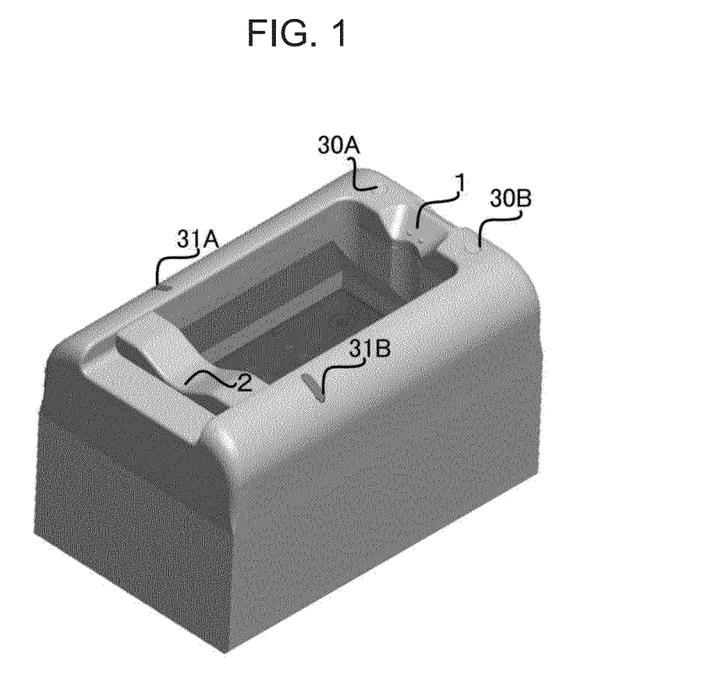
FIG. 1 is an appearance perspective view of the individual authentication apparatus in a first exemplary embodiment.
Figure 2:
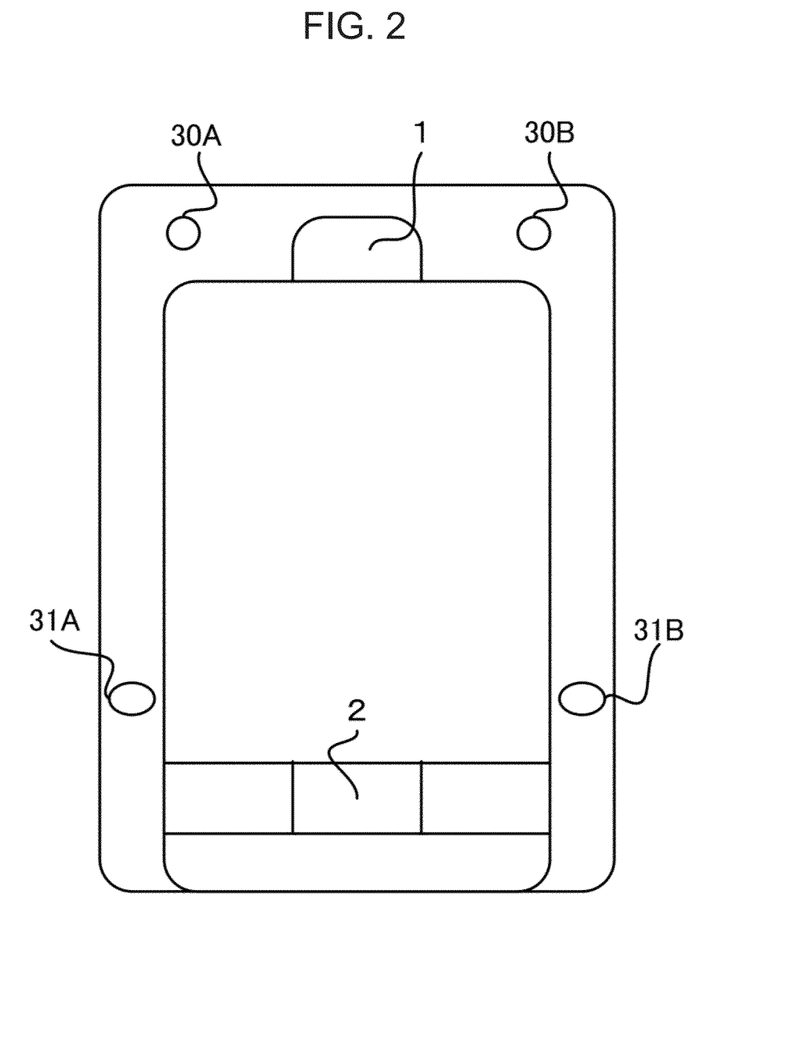
FIG. 2 is a plan view of the individual authentication apparatus in the first exemplary embodiment viewed from the top.

FIG. 1 is an appearance perspective view of the individual authentication apparatus in this exemplary embodiment, and FIG. 2 is a plan view of the individual authentication apparatus viewed from the top.

The individual authentication apparatus in the first exemplary embodiment, as shown in FIG. 1 and FIG. 2, includes a fingertip placement section 1 for placing a tip of a finger, a finger base placement section 2 for placing a base of a finger, guidance lamps 30A and 30B for a tip of a finger, and guidance lamps 31A and 31B for a finger base.

Figure 3:
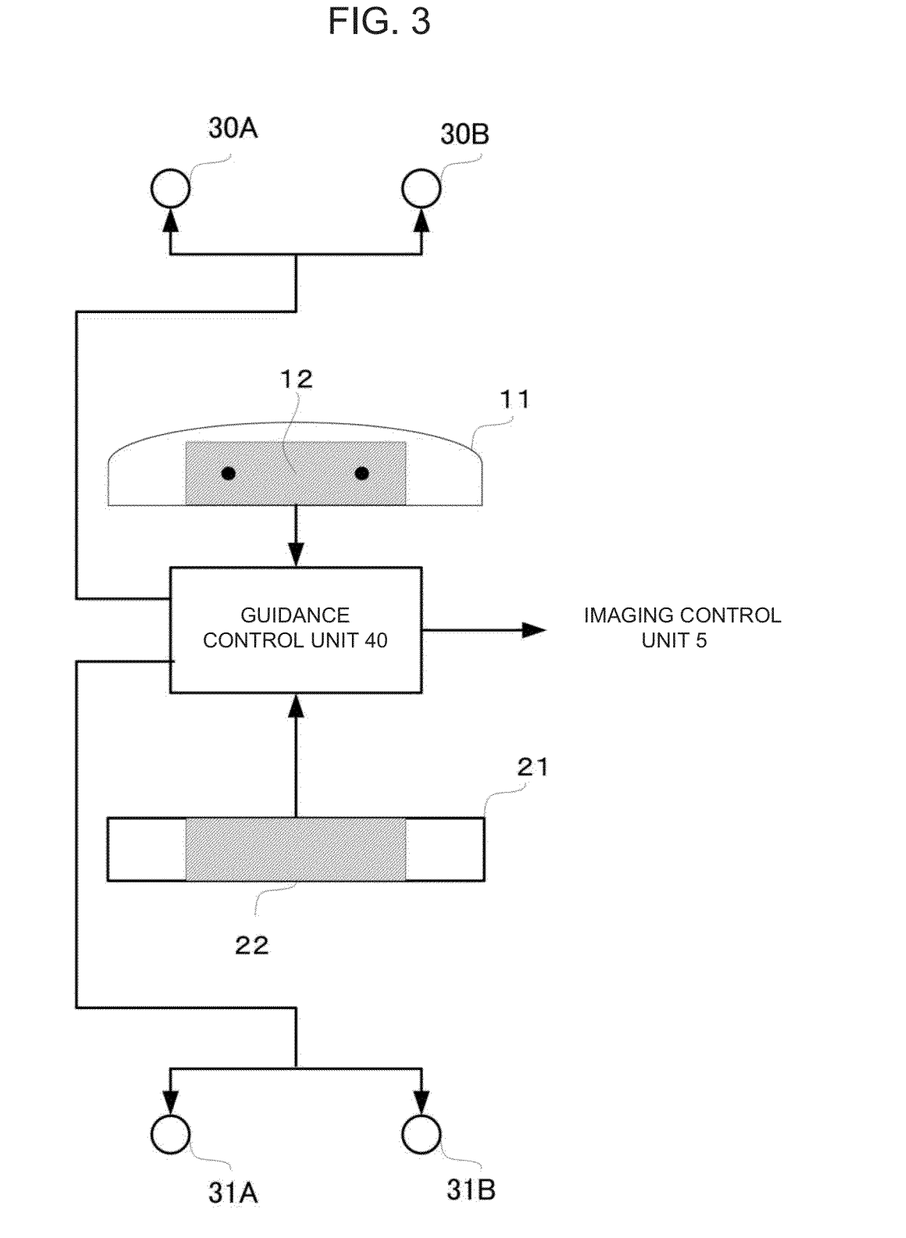
FIG. 3 is a block diagram relating to a sensor of the first exemplary embodiment.

The fingertip placement section 1, as shown in FIG. 3, includes a fingertip placement surface 11 on which the tip of the finger is placed, and a fingertip placement sensor 12 for detecting placement of the tip of the finger.

The fingertip placement surface 11 is a surface that the tip of the finger contacts, and has such a shape of a concave surface that gets itself to the tip of the finger. The fingertip placement sensor 12, which is arranged inside the fingertip placement surface 11, detects that the tip of the finger, being a target of the imaging, has been placed on the fingertip placement surface 11. And, an output of the fingertip placement sensor 12 is supplied to a guidance control unit 40 mounted inside the individual authentication apparatus.

Additionally, as the fingertip placement sensor 12, any sensor, which can detect that the tip of the finger has been placed on the fingertip placement surface 11, may be used, and specifically, there exist a physical detection apparatus such as a switch by pushing down the tip of the finger, and detection apparatuses such as a pressure sensor, an electrostatic sensor, a photoelectric sensor, and an optical sensor.

The finger base placement section 2 includes a finger base placement surface 21 on which the base of the finger is placed, and a finger base placement sensor 22 for detecting placement of the base of the finger.

The finger base placement surface 21 is a surface that the base of the finger contacts, and has such a shape of a concave surface that gets itself to the base of the finger. The finger base placement sensor 22, which is arranged inside the finger base placement surface 21, detects that the base of the finger, being a target of the imaging, has been placed on the finger base placement surface 21. And, an output of the finger base placement sensor 22 is supplied to the guidance control unit 40 mounted inside the individual authentication apparatus.

Additionally, as the finger base placement sensor 22, any sensor, which can detect that the base of the finger has been placed on the finger base placement surface 21, may be used, and specifically, there exist a physical detection apparatus such as a switch by pushing down the base of the finger by the placement, a pressure sensor, an electrostatic sensor, a photoelectric sensor, an optical sensor, and the like.

The guidance control unit 40, upon receipt of an output of the fingertip placement sensor 12, and the output of the finger base placement sensor 22, detects whether the tip of the finger has been correctly placed on the fingertip placement surface 11, or whether the base of the finger has been correctly placed on the finger base placement surface 21, and performs guidance for placing the tip or the base of the finger by employing the guidance lamps 30A and 30B for the fingertip, and the guidance lamps 31A and 31B for the finger base. Additionally, the guidance lamps 30A and 30B and the guidance lamps 31A and 31B could be flashing/lighting members such as LED and an electric lamp.

With regard to the method of performing the guidance, the guidance control unit 40, upon receipt of the output of the fingertip placement sensor 12, lights the guidance lamps 30A and 30B for the fingertip when the tip of the finger has been correctly placed on the fingertip placement surface 11, and flashes them when the tip of the finger has not been placed. Likewise, the guidance control unit 40, upon receipt of the output of the finger base placement sensor 22, lights the guidance lamps 31A and 31B for the finger base when the base of the finger has been correctly placed on the finger base placement surface 21, and flashes them when the base of the finger has not been placed.

Figure 4:
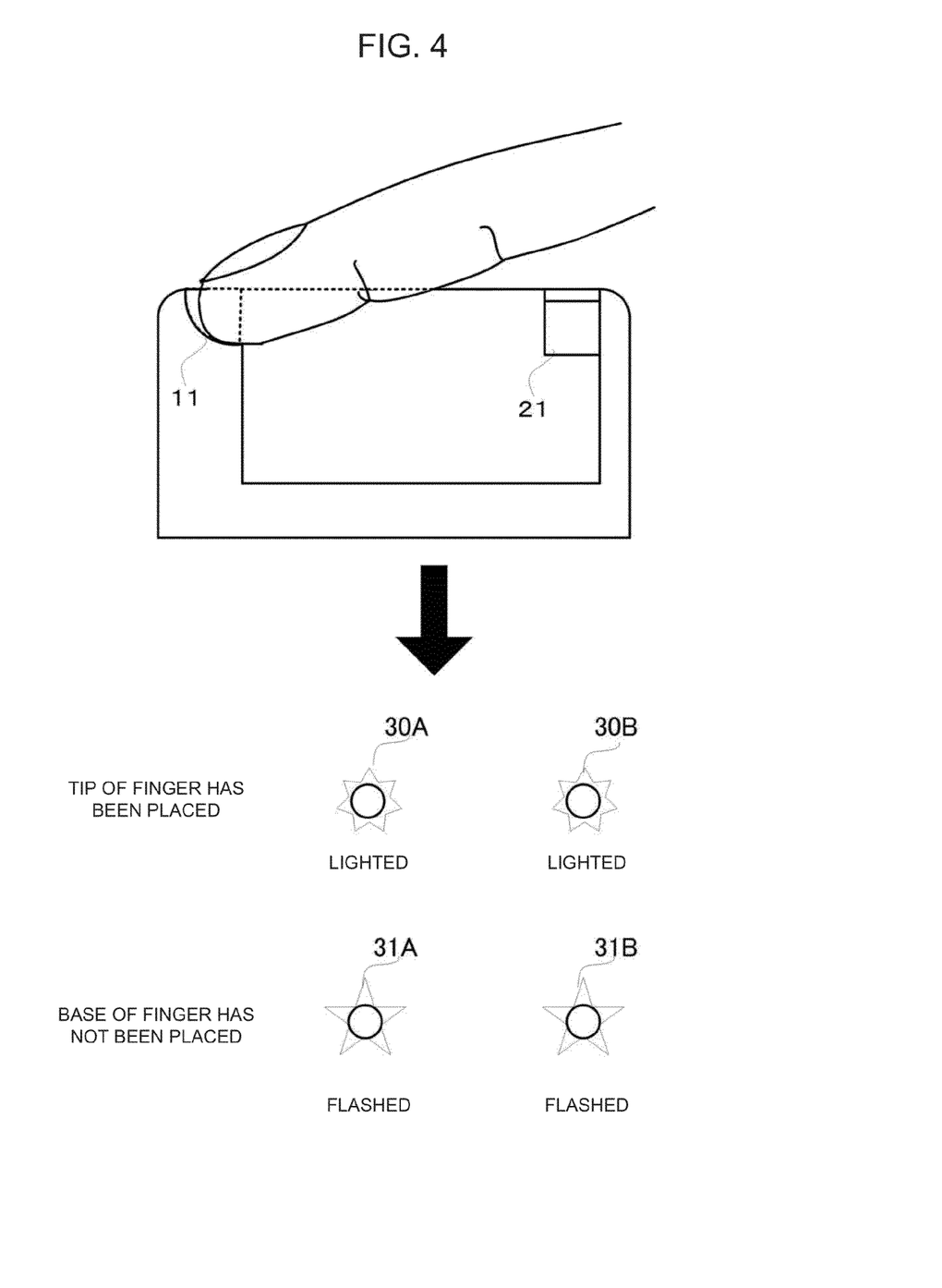
FIG. 4 is a view for explaining the first exemplary embodiment.

In addition, upon specifically explaining, for example, as shown in FIG. 4, when only the tip of the finger has been placed on the fingertip placement surface 11 and the base has not been placed on the finger base placement surface 21, the output of the fingertip placement sensor 12 indicates that the tip of the finger has been placed on the fingertip placement surface 11, and the output of the finger base placement sensor 22 indicates that the base has not been placed on the finger base placement surface 21. Thereupon, the guidance control unit 40 teaches the user that the tip of the finger has been placed on the fingertip placement surface 11 by lighting the guidance lamps 30A and 30B, and together therewith, teaches the user that the base has not been placed on the finger base placement surface 21 by flashing the guidance lamps 31A and 31B.

Figure 5:
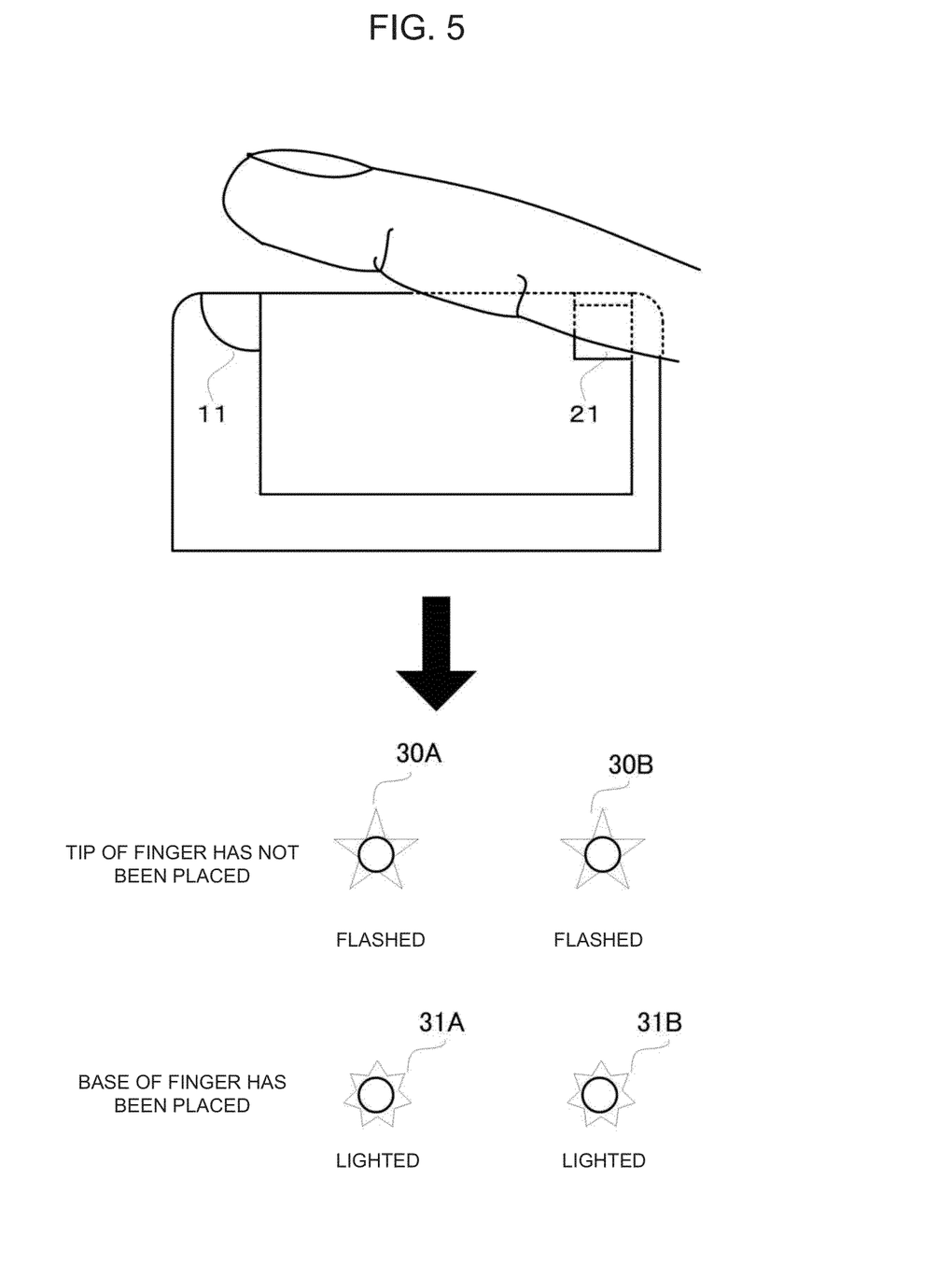
FIG. 5 is a view for explaining the first exemplary embodiment.

Further, as shown in FIG. 5, when the tip of the finger has not been placed on the fingertip placement surface 11 and the base has been placed on the finger base placement surface 21, the output of the fingertip placement sensor 12 indicates that the tip of the finger has not been placed on the fingertip placement surface 11, and the output of the finger base placement sensor 22 indicates that the base has been placed on the finger base placement surface 21. Thereupon, the guidance control unit 40 teachers the user that the tip of the finger has not been placed on the fingertip placement surface 11 by flashing the guidance lamps 30A and 30B, and together therewith, teaches the user that the base has been placed on the finger base placement surface 21 by lighting the guidance lamps 31A and 31B.

Figure 6:
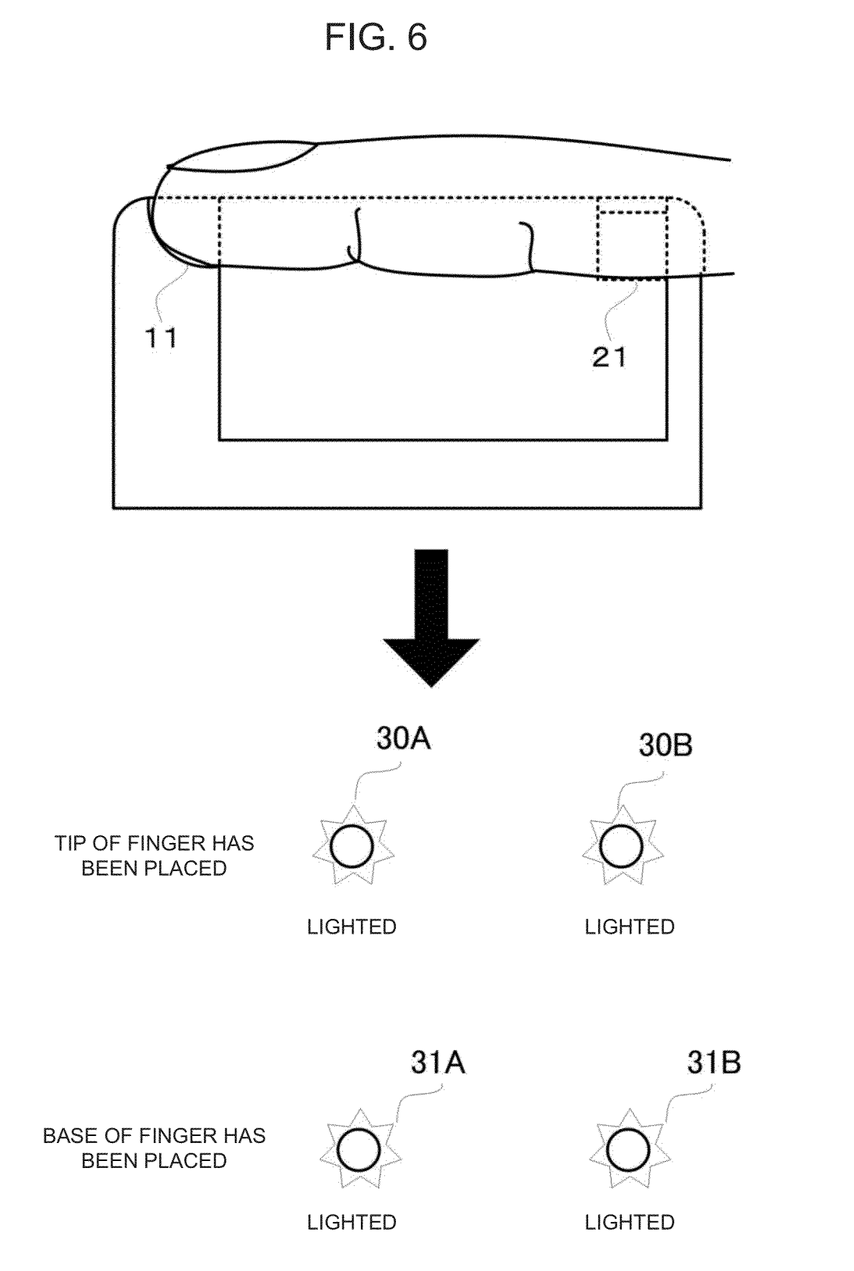
FIG. 6 is a view for explaining the first exemplary embodiment.

Further, as shown in FIG. 6, when the tip of the finger has been placed on the fingertip placement surface 11 and the base has been placed on the finger base placement surface 21, the output of the fingertip placement sensor 12 indicates that the tip of the finger has been placed on the fingertip placement surface 11, and the output of the finger base placement sensor 22 indicates that the base has been placed on the finger base placement surface 21. Thereupon, the guidance control unit 40 teaches the user that the tip of the finger has been placed on the fingertip placement surface 11 by lighting the guidance lamps 30A and 30B, and together therewith, teaches the user that the base has been placed on the finger base placement surface 21 by lighting the guidance lamps 31A and 31B.

In such a manner, when either the tip of the finger or the base of the finger has not been placed, the guidance control unit 40 lights the guidance lamp of the side in which the finger has been placed, and flashes the guidance lamp of the side in which the finger has not been placed. Further, when both of the tip of the finger and the base of the finger have been placed, the guidance control unit 40 lights both of the guidance lamps. In such a manner, the guidance control unit 40 teaches the user whether the finger has been correctly placed.

Next, an authentication function of the individual authentication apparatus in the first exemplary embodiment will be explained.

Figure 7:
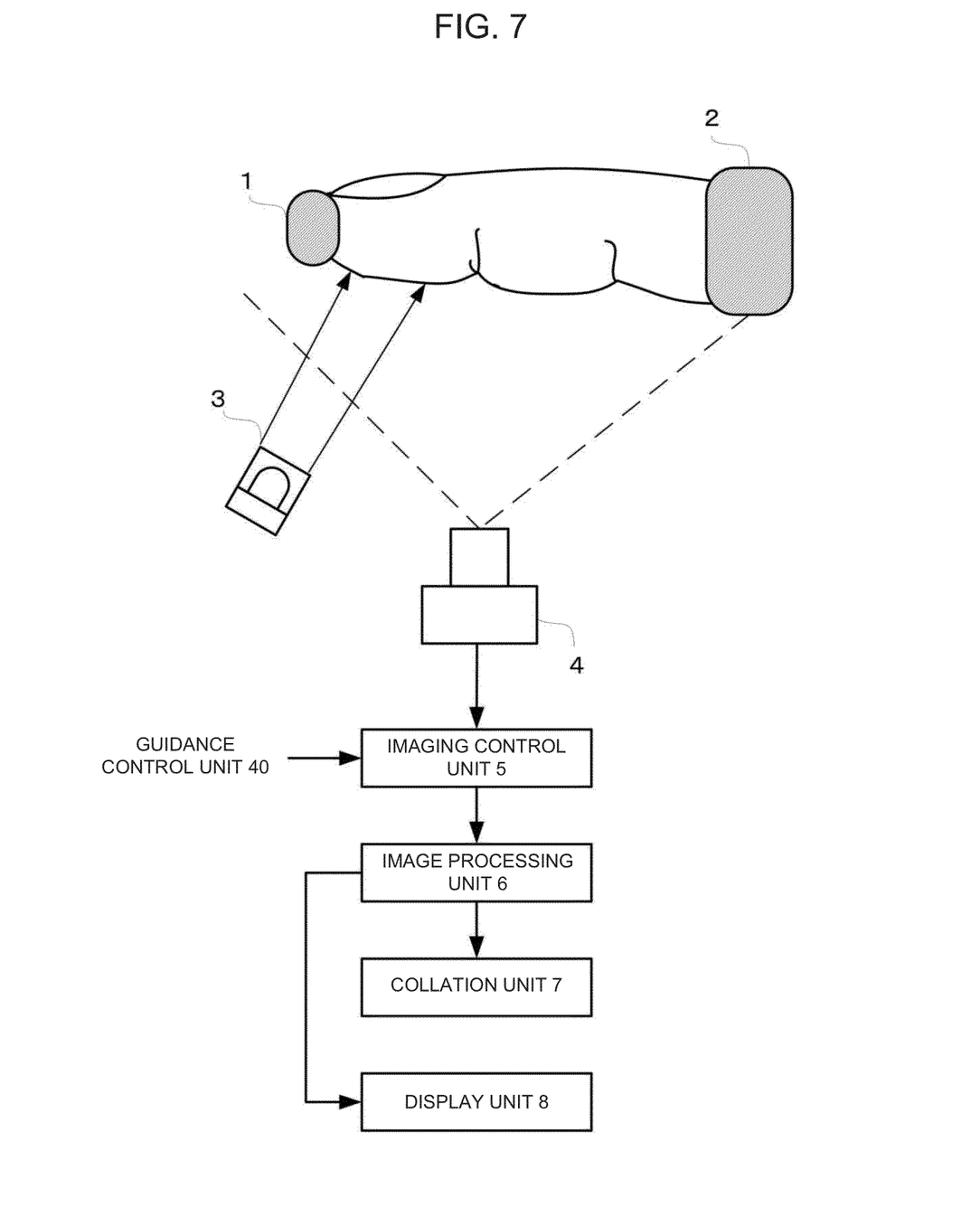
FIG. 7 is a block diagram of an authentication function of the individual authentication apparatus in the first exemplary embodiment.

FIG. 7 is a block diagram of an authentication function of the individual authentication apparatus in the first exemplary embodiment. As shown in FIG. 7, the individual authentication apparatus in the first exemplary embodiment includes a fingertip placement section 1 for placing the tip of the finger, a finger base placement section 2 for placing the base of the finger, a spot light generation light source 3, an imaging unit 4, an imaging control unit 5, an image processing unit 6, a collation unit 7, and a display unit 8.

The spot light generation light source 3, which is mounted at a position in which a contact with the finger is not made, radiates parallel light to a fingerprint portion in a spot manner at an almost uniform luminance in terms of an entirety of the fingerprint portion between a distal interphalangeal joint (first knuckle joint) and the tip of the finger. Herein, the so-called parallel light is light that is radiated at an almost identical angle to the fingerprint portion (the surface of the fingerprint portion). Further, the spot light generation light source 3 preferably radiates light from one direction because it is desired that shadow due to irregularities of the skin surface is generated as much as possible in order to image the fingerprint, being the irregularities of the skin surface of the finger.

Preferably, the spot light of the spot light generation light source 3 is visible light; however, invisible light rays such as near infrared rays can be also utilized. The spot light generation light source is comprised of a halogen lamp, a xenon lamp and a lens, or LED etc. having an emission feature within the corresponding wave length to which a lens has been attached.

The imaging unit 4 is configured of an image sensor such as CCD and CMOS, a control system, a lens optical system for focusing a fingerprint image and a blood vessel image of the finger in the image sensor, and the like. Herein, the imaging unit 4 images the fingerprint of the fingerprint portion between the distal interphalangeal joint (first knuckle joint) of the finger and the tip of the finger with reflected light to the fingerprint portion between the distal interphalangeal joint (first knuckle joint) of the finger and the tip of the finger due to radiated light coming from the spot light generation light source 3 taken as main light, and images the blood vessel with scattered light that leaks (is radiated) from the epidermis between the distal interphalangeal joint (first knuckle joint) and a proximal interphalangeal joint (second knuckle joint) as a result of the fact that the light radiated to the fingerprint portion from the spot light generation light source 3 is scattered inside the finger and is propagated. Additionally, the fingerprint and the blood vessel are simultaneously imaged by the imaging unit 4. Additionally, the imaging unit 4 is mounted at a position in which a contact with the finger is not made, similarly to the spot light generation light source 3. Further, with regard to the imaging, the fingerprint and the blood vessel may not be simultaneously imaged.

When the imaging control unit 5 is informed that both of the tip of the finger and the base of the finger have been placed by the guidance control unit 40, it starts the imaging by controlling the imaging of the imaging unit 4, prepares the signal of the imaging unit 4 as data, and sends the fingerprint image and the blood vessel image to the image processing unit 6.

The image processing unit 6 may extract a center of the fingerprint from the image data of the fingerprint acquired from the imaging control unit 5 to measure displacement of the center of the finger from an external shape. And, the image processing unit 6 may detect a rotational quantity of the finger, display correct position modification information of the finger on the display unit 8 by the above rotational quantity, and urge an authenticatee who receives the authentication to correctly modify the position of the finger. In addition, the image processing unit 6 extracts an image feature of the fingerprint and the finger blood vessel from the data of the image taken by the imaging unit 4 after correctly modifying the position of the finger, and outputs data of the extracted image feature to the collation unit 7.

The collation unit 7 in which the image feature of the fingerprint and the finger blood vessel of the authenticatee has been stored collates the stored image feature of the fingerprint and the finger blood vessel of the authenticatee with the image feature of the fingerprint and the finger blood vessel coming from the image processing unit 6, and performs the authentication.

Additionally, the image processing unit 6 or the collation unit 7 may record a plurality of pieces of reference data (the image feature of the fingerprint and the finger blood vessel) registered by previously rotating the finger of the authenticatee, select data having the rotational quantity of which the image feature approximates the image feature of the fingerprint and the finger blood vessel extracted by the image processing unit 6, and perform the collation with the image feature of the fingerprint and the finger blood vessel thereof.

Next, an operation of the imaging of the fingerprint and the blood vessel, and the collation in the first exemplary embodiment will be explained.

Figure 8:
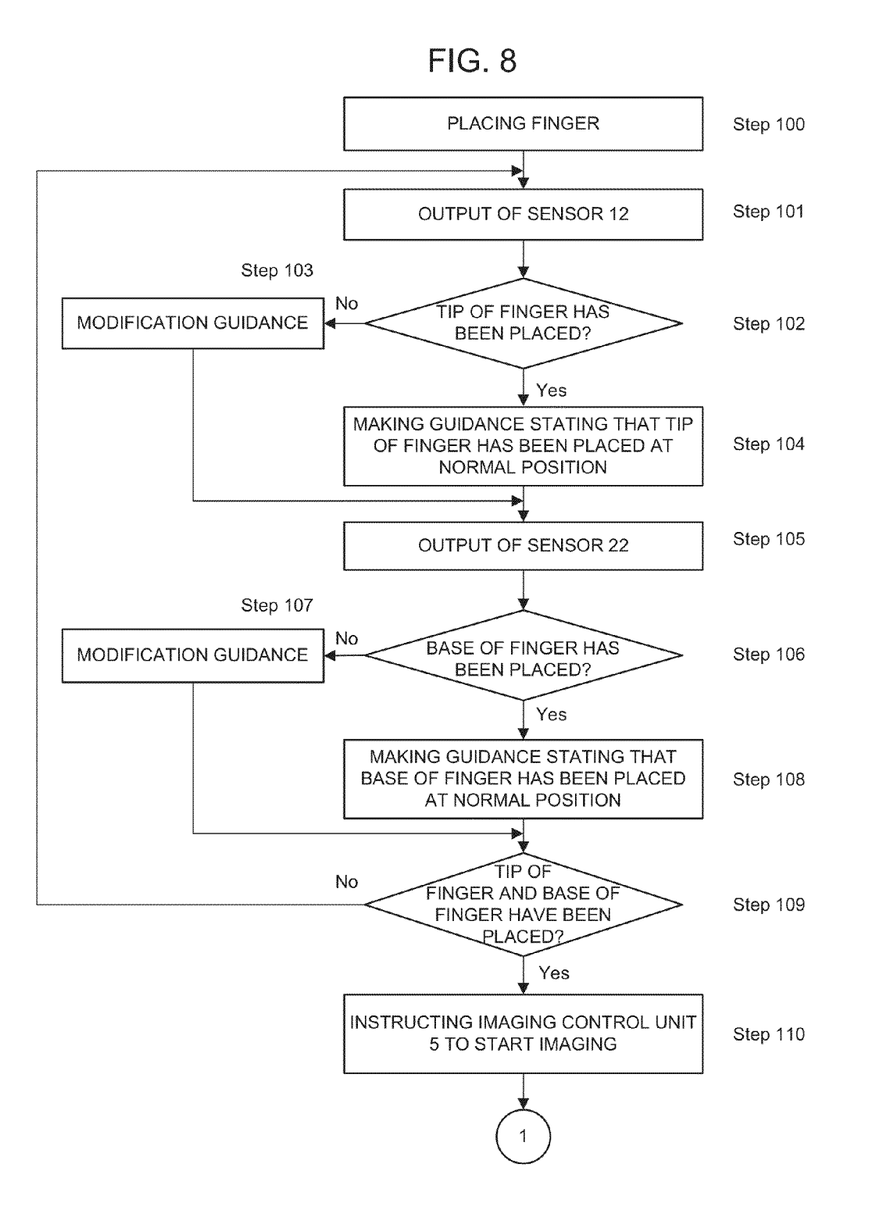
FIG. 8 is an operational flowchart of an operation in the first exemplary embodiment.
Figure 9:
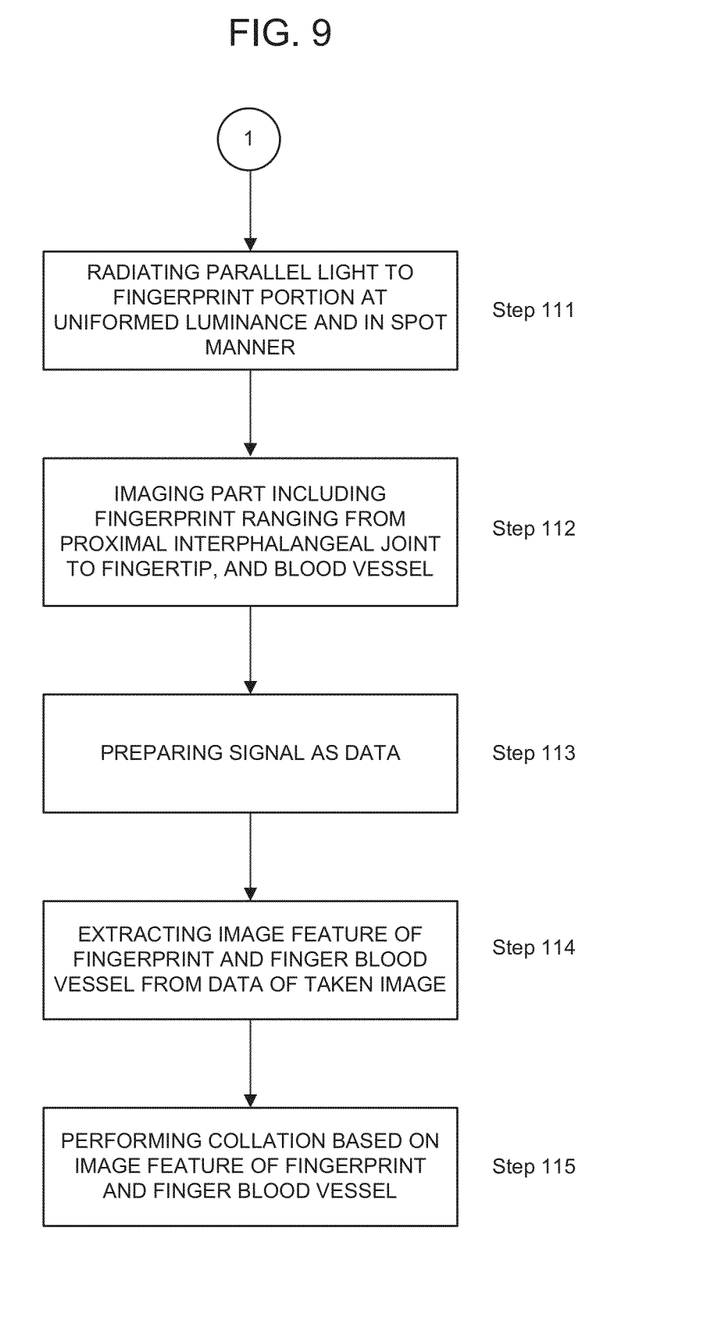
FIG. 9 is an operational flowchart of an operation in the first exemplary embodiment.

Each of FIG. 8 and FIG. 9 is an operational flowchart of the imaging of the fingerprint and the blood vessel, and the collation in the first exemplary embodiment.

At first, the finger is placed on the fingertip placement section 1 and the finger base placement section 2 (Step 100). Additionally, the guidance lamps 30A and 30B, and the guidance lamps 31A and 31B are flashed at a slowly flashing interval so as to urge the user to place the finger prior to placing the finger.

The fingertip placement sensor 12 detects a tip of the finger cushion of the placed fingertip, and outputs it (Step 101).

The guidance control unit 40, upon receipt of the output of the fingertip placement sensor 12, determines whether the tip of the finger has been normally placed on the fingertip placement surface 11 (Step 102). When the tip of the finger has been normally placed on the fingertip placement surface 11, the guidance control unit 40 lights the guidance lamps 30A and 30B for the fingertip and performs guidance stating that the tip of the finger has been placed at a normal position (Step 104). On the other hand, when the tip of the finger has not been normally placed on the fingertip placement surface 11, the guidance control unit 40 flashes the guidance lamps 30A and 30B for the fingertip and performs guidance of modification, and the operation proceeds to Step 105 (Step 103). Additionally, the guidance lamps 30A and 30B are flashed at a flashing interval shorter than the flashing interval that is used at the time of urging the user to place the finger.

Further, the finger base placement sensor 22 detects the base of the placed finger, and outputs it (Step 105).

The guidance control unit 40, upon receipt of the output of the finger base placement sensor 22, determines whether the base of the finger has been normally placed on the finger base placement surface 21 (Step 106). When the base of the finger has been normally placed on the finger base placement surface 21, the guidance control unit 40 lights the guidance lamps 31A and 31B for the finger base and performs guidance stating that the base of the finger has been placed at a normal position (Step 108). On the other hand, when the base of the finger has not been normally placed on the finger base placement surface 21, the guidance control unit 40 flashes the guidance lamps 31A and 31B for the finger base and performs guidance of the modification, and the operation proceeds to Step 109 (Step 107). Additionally, the guidance lamps 31A and 31B are flashed at a flashing interval shorter than the flashing interval that is used at the time of urging the user to place the finger.

The guidance control unit 40 judges whether both of the tip of the finger and the base of the finger have been placed based on a result of the fingertip placement sensor 12 and the finger base placement sensor 22 (Step 109).

And, when the output of the fingertip placement sensor 12 indicates that the tip of the finger has been normally placed on the fingertip placement surface 11, and the output of the finger base placement sensor 22 indicates that the base has been normally placed on the finger base placement surface 21, the guidance control unit 40 instructs the imaging control unit 5 to start the imaging (Step 110). On the other hand, when either the tip or the base of the finger has not been normally placed, the operation proceeds to the Step 101.

When the imaging is started, the parallel light is radiated to the fingerprint portion at a uniform luminance and in a spot manner (Step 111).

The imaging unit 4 images, by the imaging control unit 5, the part that includes the fingerprint ranging from the proximal interphalangeal joint (second knuckle joint) to the tip of the finger and the blood vessel of the finger (Step 112). Herein, the fingerprint portion between the distal interphalangeal joint (first knuckle joint) and the tip of the finger is imaged with the reflected light due to the radiated light taken as main light. On the other hand, comparatively large blood vessels exist between the distal interphalangeal joint (first knuckle joint) and the proximal interphalangeal joint (second knuckle joint) and just under the skin in the neighborhood of the knuckle joints. In this portion, light radiated to the fingerprint portion by the spot light generation light source 3 is scattered within the finger, is propagated within the finger, and is radiated from the epidermis, and thus the blood vessel is imaged. Additionally, the fingerprint and the blood vessel are simultaneously imaged; however, they may be imaged sequentially.

The imaging control unit 5 prepares the signal of the imaging unit 4 as data, and outputs the fingerprint image and the blood vessel image to the image processing unit 6 (Step 113).

The image processing unit 6 extracts the image feature of the fingerprint and the finger blood vessel from the data of the image taken by the imaging unit 4, and outputs data of the extracted image feature to the collation unit 7 (Step 114).

The collation unit 7 performs the collation based on the image feature of the fingerprint and the finger blood vessel coming from the image processing unit 6 (Step 115).

Figure 10:
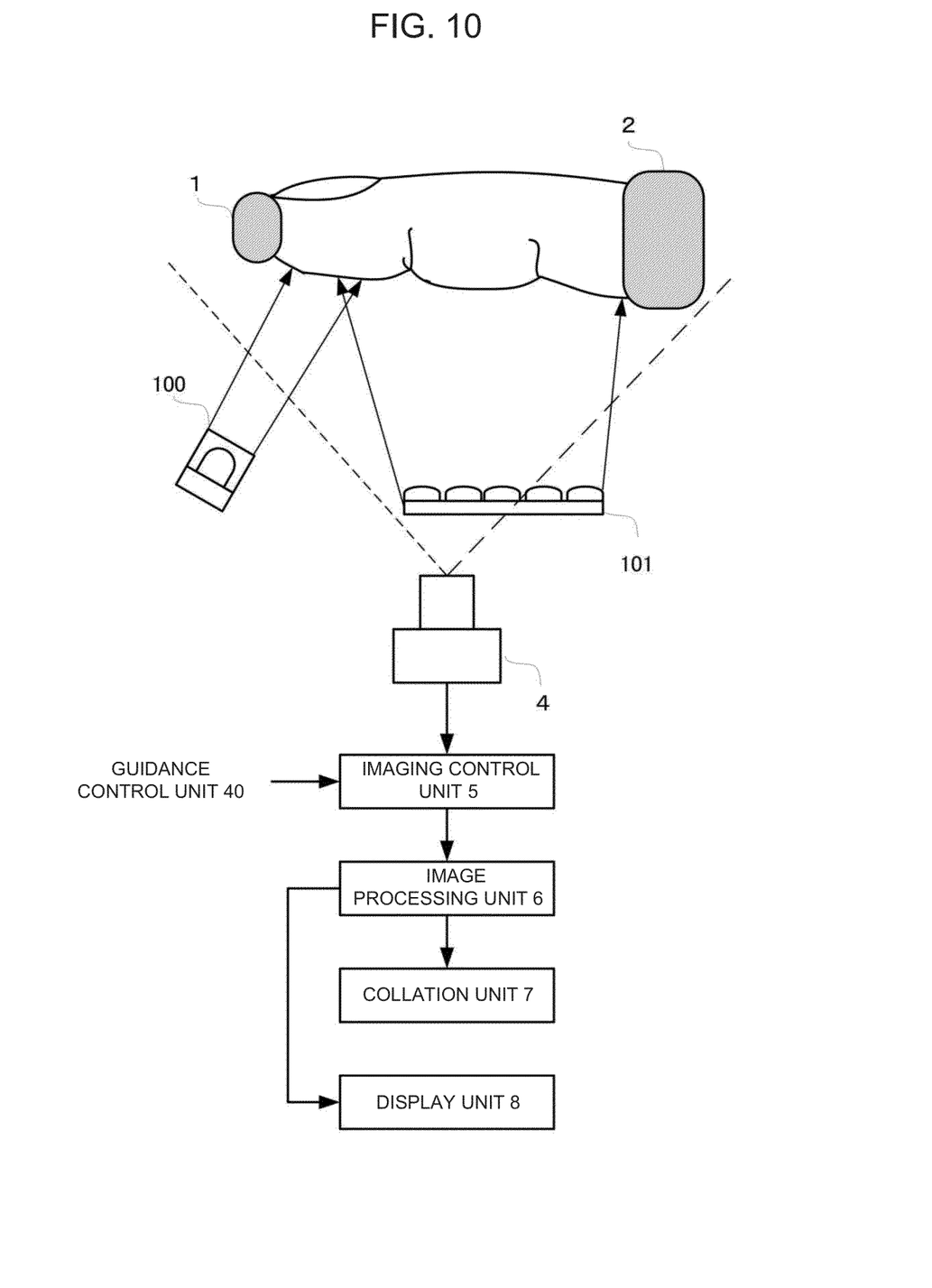
FIG. 10 is a view for explaining another individual authentication apparatus in the first exemplary embodiment.

Additionally, in the biometric authentication apparatus in the above-described first exemplary embodiment, an example of simultaneously photographing the fingerprint and the vein of the finger with one light source was explained; however the method of the photographing is not limited hereto. For example, as shown in FIG. 10, a configuration is made so that two light sources of a light source 100 and a light source 101 are mounted, the light source 100 irradiates the tip of the finger, and the light source 101 irradiates the portion ranging from the tip of the finger to the base of the finger. In this case, the fingerprint of the finger is photographed with the reflected light of the light radiated from the light source 100, and the vein (blood vessel pattern) of the finger is photographed with the reflected light of the light radiated from the light source 101. Additionally, each of the light source 100 and the light source 101 does not need to be a spot light source.

Further, it is not that the fingerprint of the finger and the vein are simultaneously photographed, but the imaging unit 4 may separately image them, respectively.

As explained above, the first exemplary embodiment exhibits an effect described below.

The first exemplary embodiment detects whether the tip and the base of the finger have been correctly placed on the placement surfaces, and performs, when they have not been correctly on either placement surface, guidance of its effect for the user, whereby, there is no failure in the image collation due to the abnormal placement.

Further, the user can place an object of the authentication without being worried about it because the first exemplary embodiment performs guidance of its effect for the user, whereby the time required for the photographing is few and, furthermore, there is no possibility that the imaging error due to wrongly placing the finger occurs.

Further, the first exemplary embodiment mounts the sensors for detecting the placement on both of the fingertip placement surface and the finger base placement surface, and individually detects the tip of the finger and the base of the finger, whereby the first exemplary embodiment can perform guidance for the user stating that anyone of the tip of the finger and the base of the finger has not been correctly placed, and thus, the user can know which should be correctly placed.

In addition, the first exemplary embodiment radiates the parallel light to the fingerprint portion of the finger in a spot manner, simultaneously takes the blood vessel images by the scattered light that is scattered inside the finger, is propagated from the fingerprint portion, and leaks out (is radiated) from the epidermis between the distal interphalangeal joint (first knuckle joint) and the proximal interphalangeal joint (second knuckle joint), and the fingerprint image by the parallel light radiated to the fingerprint portion of the finger in a spot manner with one imaging unit, whereby an effect lies in a point of being able to perform the collation process (individual authentication) for a short time with a simplified structure.

Further, also when two light sources are mounted, the first exemplary embodiment can take the fingerprint image of the finger and the blood vessel image by the reflected light with one imaging unit, whereby the collation process (individual authentication) can be performed for a short time with a simplified structure. Additionally, with regard to the imaging, the fingerprint image and the blood vessel image may be simultaneously taken with one imaging unit in some cases, and the fingerprint image and the blood vessel image may be sequentially taken in some cases.

Further, the number of the imaging units is not limited to one, and two imaging units may be prepared to take the fingerprint image and the blood vessel image of the finger with another imaging unit, respectively.

In such a manner, in the first exemplary embodiment, placing the finger on the authentication apparatus only one time makes it possible to perform the imaging of a plurality of the images, being the fingerprint image and the blood vessel image, and the collation process (individual authentication) thereof.

Further, when the parallel light is radiated to the fingerprint portion in a spot manner, the shadow is easily generated due to the irregularities of the fingerprint, and the fingerprint image having an excellent contrast is obtained due to the scattered light.

Additionally, in the first exemplary embodiment, an example of flashing or lighting the lamps was explained as the guidance for placing the finger; however, the guidance is not limited hereto. For example, a color of the lamp may be changed, and sound and vibration may be changed, and in addition, the similar effect can be obtained with the guidance by voice, the display of a message by the display unit, and the like. Further, these may be employed by combining them appropriately.

Second Exemplary Embodiment

The second exemplary embodiment will be explained.

Figure 11:
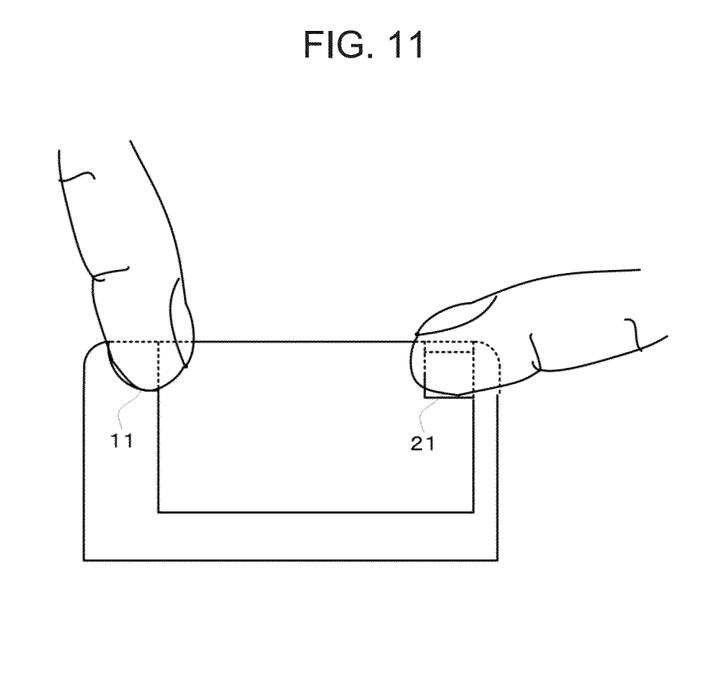
FIG. 11 is a view for explaining a second exemplary embodiment.

With the case of the authentication of the finger, and the like, the authentication apparatus is often activated intentionally due to mischief etc. For example, as shown in FIG. 11, when the tips of the fingers of both hands are placed on the fingertip placement surface 11 and the finger base placement surface 21, respectively, the first exemplary embodiment detects that the tip and the base of the finger are placed on the placement surfaces, respectively, which might incur an erroneous operation of the imaging etc.

Figure 12:
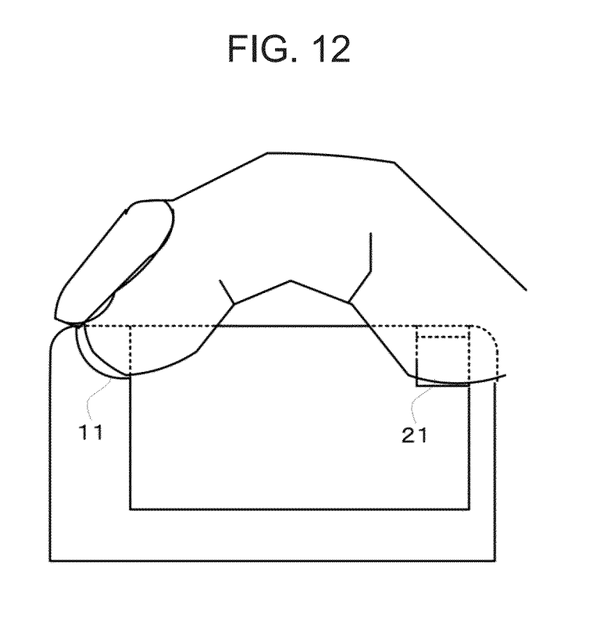
FIG. 12 is a view for explaining the second exemplary embodiment.
Figure 13:
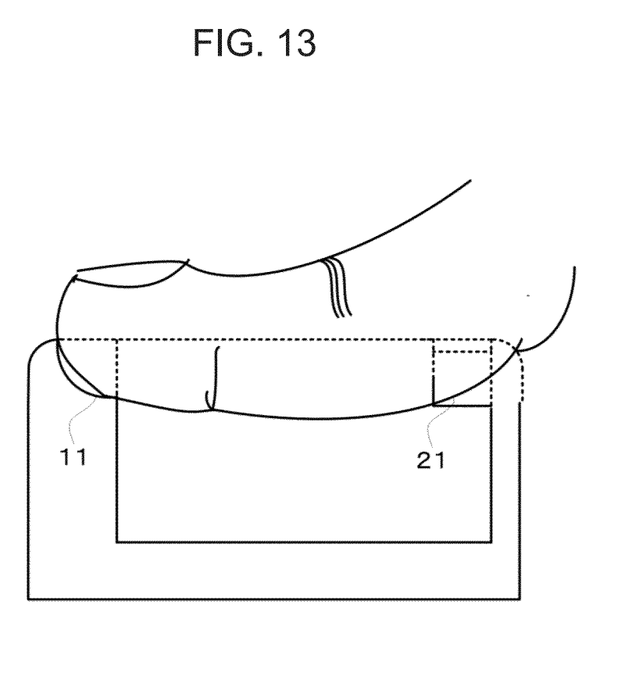
FIG. 13 is a view for explaining the second exemplary embodiment.

Further, when the finger is extremely bent in a "He" character shape as shown in FIG. 12, and also when the finger is strongly pushed into the placement surface and is bent backward as shown in FIG. 13, the first exemplary embodiment results in detecting that the tip of the finger and the base of the finger have been placed on the placement surfaces, respectively, and there is also the case in which the authentication cannot be correctly performed because the imaging is performed in this situation.

Thereupon, the second exemplary embodiment, in addition to the first exemplary embodiment, is characterized in that when it has been detected by the guidance control unit 40 that the tip and the base of the finger have been placed on the placement surfaces, respectively, the image is pre-scanned once to confirm existence of the finger and the taken image.

Hereinafter, the part in which the second exemplary embodiment differs from the first exemplary embodiment is focused for explanation, and identical codes are affixed to the parts similar to the first exemplary embodiment, so the detailed explanation is omitted.

A point in which the second exemplary embodiment differs from the first exemplary embodiment is that when the output of the fingertip placement sensor 12 indicates the placement on the fingertip placement surface 11, and the output of the finger base placement sensor 22 indicates the placement on the finger base placement surface 21, the guidance control unit 40 issues an instruction for pre-scanning to the imaging control unit 5.

The imaging control unit 5, upon receipt of the instruction coming from the guidance control unit 40, starts the imaging, and starts the formal imaging when it can recognize existence of the fingerprint image and the vein pattern. Additionally, at the time of the pre-scanning, there is no necessity for the imaging that requires a precision with which the individual authentication can be performed. Anyway, so long as existence of the fingerprint image and the vein pattern can be recognized, the imaging control unit 5 starts the formal imaging. On the other hand, if the finger is not imaged, the imaging control unit 5 informs the guidance control unit 40 of its effect.

The guidance control unit 40, upon receipt of a notification coming from the imaging control unit, flashes the guidance lamps 30A and 30B and the guidance lamps 31A and 31B, and performs guidance stating that the finger has not been correctly placed.

The second exemplary embodiment makes it possible to prevent the authentication apparatus from being activated intentionally due to mischief etc. in addition to the effect of the first exemplary embodiment.

Further, the process such as the wasteful imaging and authentication due to the placement, which is performed in such a manner that both of the tip and the base of the finger are placed on the placement surfaces but is unsuitable for the authentication, become unnecessary.

Additionally, as apparent from the above-described explanation, the guidance control unit 40 etc. can be configured with hardware; however, it can be also realized with a computer program. In this case, functions and operations similar to those of the above-described embodiments are realized with a processor that operates under a program stored in a program memory.

Further, the content of the above-mentioned exemplary embodiments can be expressed as follows.

(Supplementary note 1) A biometric authentication apparatus, comprising:

a fingertip placement detection means that detects placement of a tip of a finger on a fingertip placement section;

a finger base placement detection means that detects placement of a base of a finger on a finger base placement section; and a guidance means that performs guidance of existence of the placement of said tip of the finger or said base of the finger based on a detection result by said fingertip placement detection means and a detection result by said finger base placement detection means.

(Supplementary note 2) The biometric authentication apparatus according to Supplementary note 1, wherein said guidance means comprises:

a fingertip placement guidance means that performs guidance of the placement on said fingertip placement section;

a finger base placement guidance means that performs guidance of the placement on said finger base placement section; and a guidance control means that, when either said fingertip placement detection means or said finger base placement detection means does not detects the placement, performs guidance of the placement by the guidance means in the side in which the placement is not detected, and, when both of said fingertip placement detection means and said finger base placement detection means detect the placement, performs guidance of completion of the placement by both of the guidance means.

(Supplementary note 3) The biometric authentication apparatus according to Supplementary note 2:

wherein each of said fingertip placement guidance means and said finger base placement guidance means is a flashing/lighting member; and wherein when either said fingertip placement detection means or said finger base placement detection means does not detect the placement, said guidance control means flashes said flashing/lighting member in the side in which the placement is not detected, and when both of said fingertip placement detection means and said finger base placement detection means detect the placement, said guidance control means lights both of said flashing/lighting members.

(Supplementary note 4) The biometric authentication apparatus according to one of Supplementary note 1 to Supplementary note 3, wherein when both of said fingertip placement detection means and said finger base placement detection means detect the placement, said guidance control means gives an instruction for staring imaging of a portion, being a target of authentication.

(Supplementary note 5) The biometric authentication apparatus according to one of Supplementary note 1 to Supplementary note 3, wherein when both of said fingertip placement detection means and said finger base placement detection means detect the placement, said guidance control means gives an instruction for staring preliminary imaging of a portion, being a target of authentication, and performs guidance of the placement of the finger by said fingertip placement guidance means and said finger base placement guidance means when as a result of said preliminary imaging, the target of authentication is not confirmed.

(Supplementary note 6) A biometric authentication method, comprising:
detecting placement of a tip of a finger on a fingertip placement section;
detecting placement of a base of a finger on a finger base placement section; and
performing guidance of existence of the placement of said tip of the finger or said base of the finger based on a detection result of the placement of said tip of the finger and a detection result of the placement of said base of the finger.

(Supplementary note 7) The biometric authentication method according to Supplementary note 6, comprises:
performing guidance for urging the placement by the side in which the placement is not detected when either detection of the placement of said tip of the finger or detection of the placement of said base of the finger is not made; and
performing guidance for completing the placement when both of detection of the placement of said tip of the finger and detection of the placement of said base of the finger are made.

(Supplementary note 8) The biometric authentication method according to Supplementary note 7:
wherein the guidance method of detecting the placement is a method of lighting by a flashing/lighting member; and
wherein the guidance method of not detecting the placement is a method of flashing by a flashing/lighting member.

(Supplementary note 9) The biometric authentication method according to one of Supplementary note 6 to Supplementary note 8, comprising giving an instruction for staring imaging of a portion, being a target of authentication, when both of detection of the placement of said tip of the finger and detection of the placement of said base of the finger are made.

(Supplementary note 10) The biometric authentication method according to one of Supplementary note 6 to Supplementary note 8 comprising performing preliminary imaging of a portion, being a target of authentication, when both of detection of the placement of said tip of the finger and detection of the placement of said base of the finger are made, and performing guidance for urging re-placement when the target of authentication is not confirmed as a result of said preliminary imaging.

This application is based upon and Supplementary notes the benefit of priority from Japanese patent application No. 2010-249629, filed on Nov. 8, 2010, the disclosure of which is incorporated herein in its entirety by reference.

Above, although the present invention has been particularly described with reference to the preferred embodiments and the examples, it should be readily apparent to those of ordinary skill in the art that the present invention is not always limited to the above-mentioned embodiments and the examples, and changes and modifications in the form and details may be made without departing from the spirit and scope of the invention.

REFERENCE SIGNS LIST 1 fingertip placement section
2 finger base placement section
3 spot light generation light source
4 imaging unit
5 imaging control unit
6 image processing unit
7 collation unit
8 display unit
11 fingertip placement surface
12 fingertip placement sensor
21 finger base placement surface
22 finger base placement sensor
30A, 30B guidance lamps for a fingertip
31A, 31B guidance lamps for a finger base
40 guidance control unit
100, 101 light sources

What is claimed is:

1. An apparatus, comprising:
a fingertip placement detector that detects placement of a fingertip on a fingertip placement section;
a finger base placement detector that detects placement of a base of a finger on a finger base placement section;
a fingertip placement lighting member that performs guidance of the placement on the fingertip placement section;
a finger base placement lighting member that performs guidance of the placement on the finger base placement section; and
a guidance controller that
controls the lighting member in the side in which the placement is not detected to light in a first lighting manner when either the fingertip placement detector or the finger base placement detector detects the placement, and
controls both of the lighting members to light in a second lighting manner when both the fingertip placement detector and the finger base placement detector detect the placement.

2. The apparatus according to claim 1, wherein when both the fingertip placement detector and the finger base placement detector detect the placement, the guidance controller gives an instruction for starting imaging of a portion, being a target of authentication.

3. The apparatus according to claim 1, wherein when both the fingertip placement detector and the finger base placement detector detect the placement, the guidance controller gives an instruction for starting preliminary imaging of a portion, being a target of authentication, and controls the fingertip placement guidance lighting member and the finger base placement guidance lighting member to perform the guidance of the placement when as a result of the preliminary imaging, the target of authentication is not confirmed.

4. The apparatus according to claim 1:
wherein the guidance controller controls the lighting members to light differently from each other when either the fingertip placement detector or the finger base placement detector detects the placement.

5. The apparatus according to claim 1:
wherein the first lighting manner is flashing and the second lighting manner is flashing.

6. A method, comprising:
detecting placement of a fingertip on a fingertip placement section;
detecting placement of a base of a finger on a finger base placement section;
performing guidance of the placement on the fingertip placement section with a fingertip placement lighting member;
performing guidance of the placement on the finger base placement section with a finger base placement lighting member;
controlling the lighting member in the side in which the placement is not detected to light in a first lighting manner when either the fingertip placement is detected or the base of the finger placement is detected, and
controlling both of the lighting members to light in a second lighting manner when both the fingertip placement is detected and the base of the finger placement is detected.

7. The method according to claim 6, further comprising:
performing guidance for urging the placement by the side in which the placement is not detected when either detection of the placement of the fingertip or detection of the placement of the base of the finger is not made.

8. The method according to claim 7:
wherein the fingertip placement lighting member and the finger base placement lighting member are each a flashing member.

9. The method according to claim 6, further comprising giving an instruction for starting imaging of a portion, being a target of authentication, when both of detection of the placement of the fingertip and detection of the placement of the base of the finger are made.

10. The method according to claim 6, further comprising:
performing preliminary imaging of a portion, being a target of authentication, when both of detection of the placement of the fingertip and detection of the placement of the base of the finger are made; and
performing guidance for urging re-placement when the target of authentication is not confirmed as a result of the preliminary imaging.

11. The method according to claim 6:
wherein the first lighting manner is flashing and the second lighting manner is flashing.

* * * * *